United States Patent [19]

DeHaven

[11] 4,242,169

[45] Dec. 30, 1980

[54] TIRE RETREADING APPARATUS

[75] Inventor: William M. DeHaven, Asheboro, N.C.

[73] Assignee: Harrelson Rubber Company, Asheboro, N.C.

[21] Appl. No.: 83,746

[22] Filed: Oct. 11, 1979

[51] Int. Cl.³ ............................................. B29H 17/36
[52] U.S. Cl. ............................. 156/394; 150/54 B; 156/96; 301/11 CD; 301/23; 301/37 N
[58] Field of Search ........................ 156/96, 126–129, 156/394; 150/54 R, 54 A, 54 B; 301/9 CN, 10 R, 11 CD, 23, 35 BJ, 37 R, 37 ST, 37 TC, 37 N

[56] References Cited

U.S. PATENT DOCUMENTS

| | | | |
|---|---|---|---|
| 2,387,188 | 10/1945 | Spingler | 301/37 N |
| 3,884,739 | 5/1975 | Hindin et al. | 156/96 |
| 4,013,499 | 3/1977 | Benigri | 156/394 |
| 4,092,203 | 5/1978 | Harrelson | 156/394 |
| 4,153,497 | 5/1979 | Budriol | 156/394 |

*Primary Examiner*—John E. Kittle
*Attorney, Agent, or Firm*—Joseph H. Heard

[57] ABSTRACT

Precise positioning and securement of annular envelope-sealing members in desired relationship with a rim-mounted tire, having a replacement tread strip and a flexible impervious envelope thereon, are achieved by mating screw-threaded members carried by and extending axially of the tire-mounting rim and each of the annular members. The screw-threaded means carried by the tire-mounting rim may be and preferably is fixedly connected thereto when the rim is of a two-part type used for curing purposes, and may be releasably connected to a tire-mounting rim of a unitary cylindrical type such as is employed for the vehicular mounting of a truck tire.

11 Claims, 6 Drawing Figures

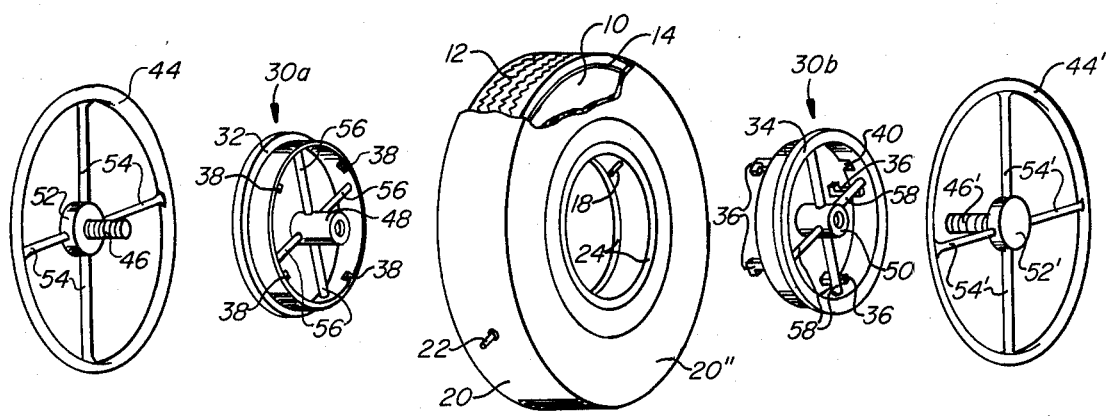
FIG. 1
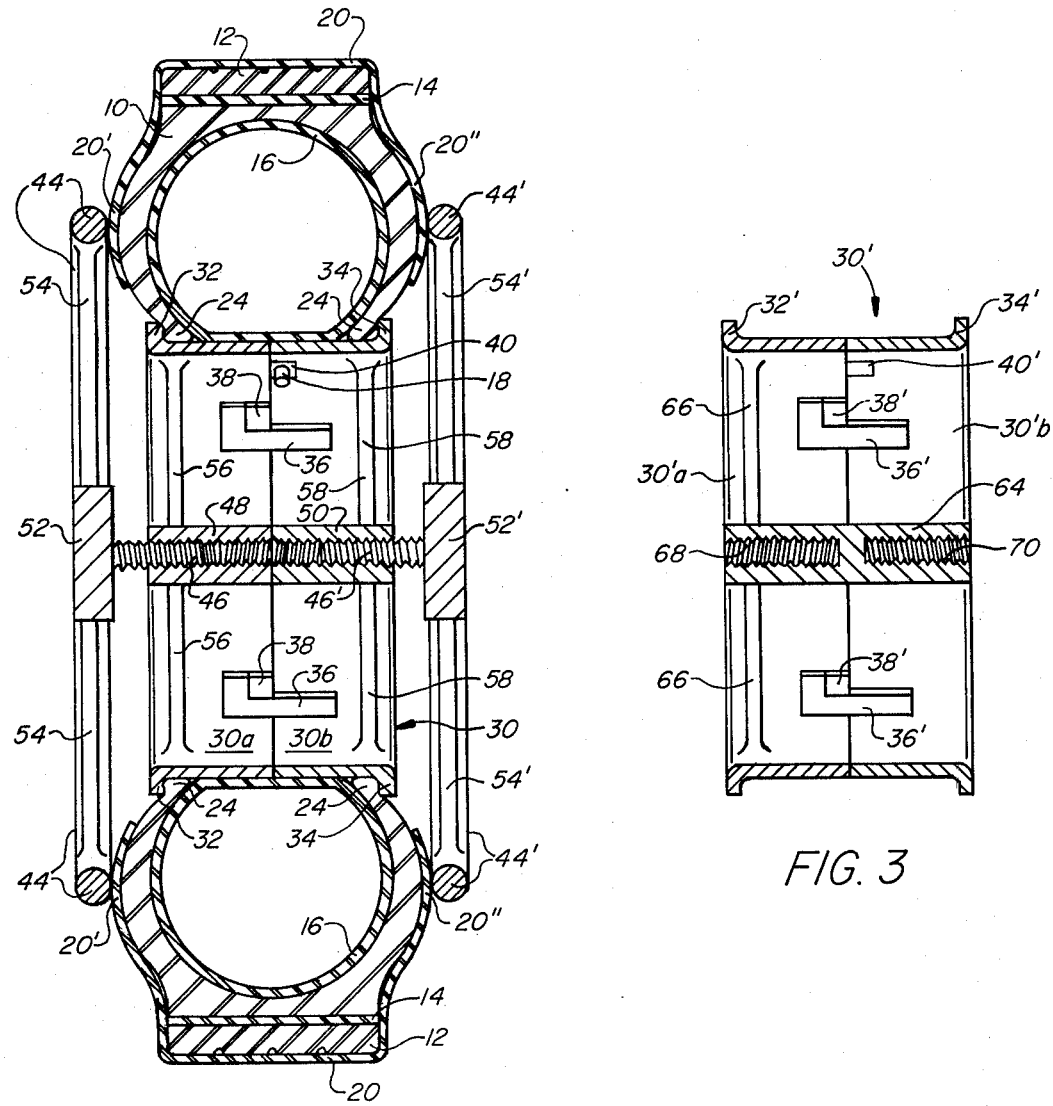
FIG. 2
FIG. 3

TIRE RETREADING APPARATUS

BACKGROUND OF THE INVENTION

This invention relates to tire retreading operations of the type wherein, in preparation for treatment within a heated pressure chamber, a rim-mounted tire having a replacement tread strip thereon is partially enclosed by a flexible impervious envelope having marginal edge portions that overlie opposite sidewalls of the tire and that in turn are overlaid by respective ones of a pair of annular envelope-sealing members. The invention more specifically relates to an improved apparatus for positioning and securing the annular sealing members in axially-aligned relationship to the rim-mounted tire and in overlying relationship to opposite ones of the envelope margins and tire sidewalls.

Commonly-assigned U.S. Pat. No. 4,092,203 discloses a tire retreading apparatus of the general type described above and wherein a first one of the annular sealing members has a shaft that projects axially from its center hub through the tire-mounting rim and thence through and beyond an opening provided within the center hub of the second one of the annular sealing members. The end portion of the shaft projecting beyond the second sealing member has clamping means associated therewith and, depending upon the width dimensions of the particular tire disposed between the annular members, may have one or more spacer discs mounted thereon between the clamping means and the center hub of the second annular member. While the aforesaid apparatus possesses numerous beneficial features, it is also subject to certain deficiencies. One person cannot assemble the annular members upon opposite sides of the rim-mounted and envelope-enshrouded tire while it is in an upright position. Each assembly operation therefore requires two persons, or requires that the tire be laid upon its side. Secondly, and irrespective of which the foregoing assembly procedures is followed, there is no assurance that the same will result in the annular members being in precise axial alignment with the tire, as is desirable. Thirdly, the projection of the free end portion of the shaft carried by the first annular member outwardly beyond the hub of the second annular member increases the overall width of the completed assembly, and therefore lessens the number of similar assemblies that can be simultaneously treated within the heated pressure chamber. Lastly, the spacer discs employed in the aforesaid apparatus, for the purpose of permitting its accommodation of tires of varying widths, add to both its cost and assembly-time.

SUMMARY OF THE INVENTION

The present invention provides an improved tire retreading apparatus, of the above-described type used in association with a rim-mounted tire having thereon a replacement tread strip and a flexible impervious envelope overlying such tread strip and opposite sidewalls of the tire, having first and second annular envelope sealing members that may consistently be quickly and easily secured by a single person in precise axial alignment with the tire and rim and in overlying relationship to opposite ones of the tire sidewalls and the envelope margins thereon; that has no space-occupying components projecting laterally outwardly beyond the aforesaid annular members; and that readily accomodates tires of varying thickness without the use of spacer discs or the like.

In accordance with the present invention, first and second shaft-like threaded members are carried by and project axially from respective first and second ones of the annular envelope-sealing members, and mating threaded means is carried by and extends coaxially within the rim mounting the tire to be retreaded. Establishment of a mating threaded relationship between the first threaded member and the threaded means carried by the rim automatically axially aligns the first annular member with the rim and with the tire. Rotation of such annular member in the appropriate direction then causes the same to move axially into engagement with the adjacent one of the envelope-overlaid tire sidewalls. The second annular member is positioned and secured in the same manner as the first member, but totally independently thereof. No adjustments or additional components are required to accommodate tires of varying sidewall thickness. Irrespective of the particular tire thickness, each annular member is simply rotated about its central axis until the member engages the envelope margin overlying the tire sidewall upon its side of the tire. This is done while the tire is in less than a fully-inflated condition so that, following engagement of both annular members with respective ones of the envelope margins, the force of such engagement may be increased by further inflation of the tire as required to effect fluid-tight sealed relationships between the envelope margins and the tire sidewalls overlaid thereby.

The threaded means disposed within the tire-mounting rim may be fixedly and permanently secured thereto when the rim is of a non-vehicular "curing" type specifically adapted for use in tire retreading. Alternatively, the threaded means may have means associated therewith for releasably securing the same within and concentrically of a tire-mounting rim of, for instance, the type customarily employed for the vehicular mounting of truck tires. This permits such tires to be retreaded without substitution of "curing" rims for the rims upon which they are mounted during vehicular use.

DESCRIPTION OF THE DRAWINGS

Other features of the invention will be apparent from the following description of illustrative embodiments thereof, which should be read in conjunction with the accompanying drawings, in which:

FIG. 1 is an exploded perspective view of tire retreading apparatus in accordance with the invention, and of a tire having a replacement tread strip and a flexible envelope thereon, the envelope being partially broken-away, in association with which the apparatus is usable;

FIG. 2 is an enlarged vertical section showing the components of FIG. 1 in assembled condition;

FIG. 3 is a vertical sectional view of another embodiment of the threaded means carried by the tire-mounting rim;

DESCRIPTION OF THE ILLUSTRATED EMBODIMENTS

Figure 4:
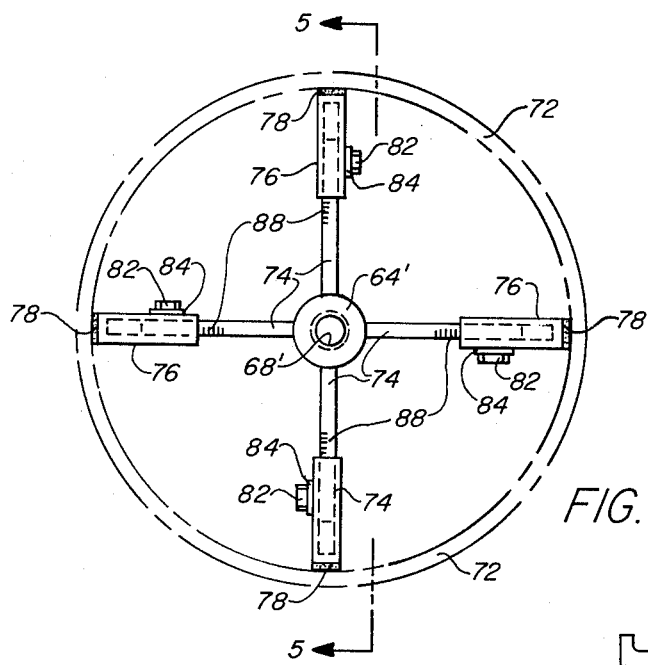
FIG. 4 is an end elevational view of an embodiment of the threaded means in which releasable means are associated therewith for securing the same within a vehicular-type tire-mounting rim, shown by phantom lines.

In FIGS. 1 and 2 of the drawings the numeral 10 designates a tire encircled by a replacement tread strip 12 that is adapted to be permanently secured to the tire by the curing of an intervening layer of binder material 14 during treatment of the FIG. 2 assembly within a heated pressure chamber (not shown). While strip 12 may be and illustratively is formed of precured rubber, it need not be so formed and might itself undergo curing within the aforesaid chamber. An air bag 16 having a valve member 18 is disposed with tire 10 and a flexible impervious envelope 20, having a vent-valve member 22, overlies the replacement tread strip 12 upon the tire. Envelope 20 has opposite marginal edge portions 20', 20" that overlie respective ones of the opposite sidewalls of the tire 10, but which terminate short of the tire's center opening and bead surfaces 24.

The tire-mounting rim 30 shown in FIGS. 1 and 2 is of a two-part type including a pair of cylindrical rim sections, 30a, 30b that respectively have radial flanges 32, 34 at their outer ends. Rim sections 30a, 30b are adapted to be releasably secured together, with their inner ends in aligned abutting relationship, by cooperating means upon their interior surfaces. The aforesaid means comprises a plurality of hook-like members 36 secured to the interior cylindrical surface of rim section 30b, at spaced locations about the circumference thereof, and projecting from the inner end of such rim section; and a corresponding plurality of block-like members 38 affixed at equally spaced locations upon the interior cylindrical surface of rim section 30a. Rim sections 30a, 30b have an outer diameter approximately the same as that of the center opening of tire 10, and are insertable into such opening from opposite sides of the tire. When so inserted their inner ends abut, their respective flanges 32, 34 engage and overlie opposite ones of the tire beads 24, and valve 18 of air bag 16 projects through an opening 40 provided within rim section 30b. Rim section 30a is then rotated about the central axis of the rim and tire to bring the block-members 38 thereon into captive engagement with the end portions of the hook-like members 36 upon rim section 30b, thereby securing the rim sections to each other and to tire 10 as shown in FIG. 2.

The apparatus of FIGS. 1 and 2 further includes a pair of annular envelope-sealing members 44, 44' that may be and preferably and illustratively are identically constructed of rigid metal stock of circular cross-sectional shape. The diameter of members 44, 44' is approximately the same as the diameter of tire 10 at its sidewall "crown" (i.e., maximum width) areas. Annular members 44, 44' are adapted to be independently positioned and secured upon opposite sides of tire 10 with their central axes in alignment with the common central axis of the tire and rim 30, and with respective ones of such members in encircling overlying engagement with the envelope marginal edge portions 20', 20" that overlie the opposite sidewalls of tire 10. Releasable means for so positioning and securing annular members 44, 44' are provided in association with such members and in association with rim 30. In the embodiment thereof shown in FIGS. 1 and 2, such means comprises externally-threaded cylindrical members 46, 46', of identical shaft-like construction, respectively carried by members 44, 44'; and mating internally-threaded cylindrical members 48, 50 respectively carried by sections 30a, 30b of tire-mounting rim 30. Member 46 is fixedly secured to or formed integrally with a hub-like member 52 centrally and fixedly mounted within annular member 46 by innerconnecting spoke-like elements 54. Member 46 projects axially from the center of annular member 46 on that side thereof engagable with envelope marginal edge portion 20'. Member 46' is similarly fixedly secured to annular member 44', by identical hub and spoke members 52', 54', and projects axially from that side thereof engagable with envelope marginal edge portion 20".

Internally threaded member 48 is fixedly and concentrically mounted within rim section 30a by a plurality of spoke-like elements 56 extending between and fixedly secured at their opposite ends to member 48 and to the inner cylindrical surface of rim section 30a. Internally threaded member 50 is similarly fixedly and concentrically mounted within rim section 30b by spoke-like elements 58. The length of each internally threaded member 48, 50 is approximately the same as the length of the rim section 30a, 30b within which it is mounted. As shown in FIG. 2, the confronting ends of members 48, 50 are therefore disposed in closely adjacent relationship to each other when rim 30 is assembled within center opening 28 of tire 10. At such time members 56, 58 also are of course axially aligned with each other and concentric with the common central axis of rim 30 and tire 10.

The placement and securement of annular members 44, 44' in proper association with the rim-mounted, envelope-enshrouded tire 10 can be quickly and easily accomplished by a single person. Such person simply grasps one of the annular members, e.g., member 44, inserts the free end of the therewith-associated member 46 into the outer end of the member 48 within rim section 30a, and establishes a mating relationship between the complementary screw-threads of members 46, 48. This automatically precisely aligns the central axis of member 44 with the common central axis of rim 30 and tire 10. The person then spins or otherwise rotates member 44 about its central axis in whichever direction (clockwise in the case of the usual screw threads) causes the mating screw threads upon members 46, 48 to move annular member 44 axially toward and into overlying engagement with marginal edge portion 20' of envelope 20. Positioning and securement of the other annular member 44' in axial alignment with tire 10 and in overlying engagement with the other envelope marginal edge portion 20' upon the opposite sidewall of tire 10 is independently achieved in the same manner by establishing a mating threaded relationship between members 46', 50, and then rotating member 44' about its central axis. After members 44, 44' have been thus brought into engagement with the respective envelope margins 20', 20", the air bag 16 within tire 10 is further inflated (via its still readily-accessible valve 18) so as to increase the force of the aforesaid engagement and establish fluid-tight sealed relationship between the respective envelope margins and the tire sidewalls overlaid thereby. As is well known to those skilled in the art, the aforesaid fluid-tight sealed relationships between the sidewalls of tire 10 and the marginal edge portions of envelope 20 are maintained during treatment of the FIG. 2 assembly within a heated pressure chamber (not shown). Following such chamber treatment, annular members 44, 44' may be removed from the FIG. 2 assembly as easily as they were installed thereon, simply by partially deflating tire 10 and then rotating members 44, 44' in appropriate directions (normally counter-clockwise) to effect axial movement thereof away from tire 10 and rim 30. It will be noted that no adjustments or additional components are required for use of annular members 44, 44' in association with tires having sidewall width dimensions that are greater or less than the width dimension of the illustrated tire 10; and that, irrespective of the tire size, all components of the FIG. 2 assembly are disposed between the planes of the outer sides of members 44, 44'.

Referring now to the alternative embodiment of FIG. 3, the tire-mounting rim 30' there shown is of the same two-part construction as previously-described rim 30, and its corresponding components are designated by the same reference numerals with the addition of a prime designation. The threaded means associated within rim 30' consists of a single elongate cylindrical member 64 that projects coaxially and coextensively through rim 30'. A plurality of spoke-like elements 66 extend between and fixedly innerconnect member 64 and one of the rim sections, illustratively section 30'a, of rim 30'. The other rim section 30'b and member 64 are not innerconnected, which permits the two sections of rim 30' to be inserted into and removed from the center opening of a tire from opposite sides thereof in the same manner as the rim 30 of FIGS. 1 and 2. Internally threaded central bores 68, 70 open from the respective outer ends of member 70 and each respectively extend along approximately one-half of its length. The internally threaded bores 68, 70 of member 64 matingly receive respective ones of the externally threaded members 46, 46' carried by annular members 44, 44' (FIGS. 1 & 2) in the same manner as the members 48, 50 associated with previously-described rim 30.

Figure 5:
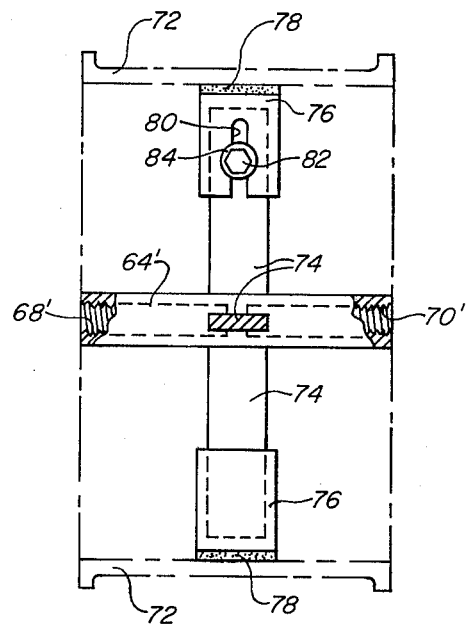
FIG. 5 is a view taken approximately along the line 5—5 through the components of FIG. 4, with the opposite end portions of the threaded means partially broken-away.
Figure 6:
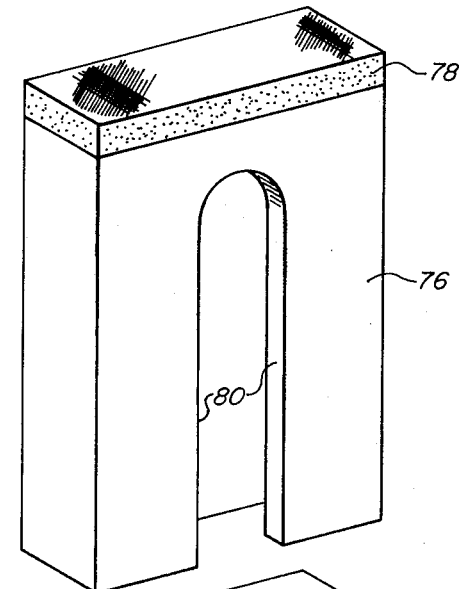
FIG. 6 is an enlarged exploded perspective view of an end portion of one of the spoke-like members and of associated components of the releasable means shown in FIGS. 4 and 5.
Figure 6:
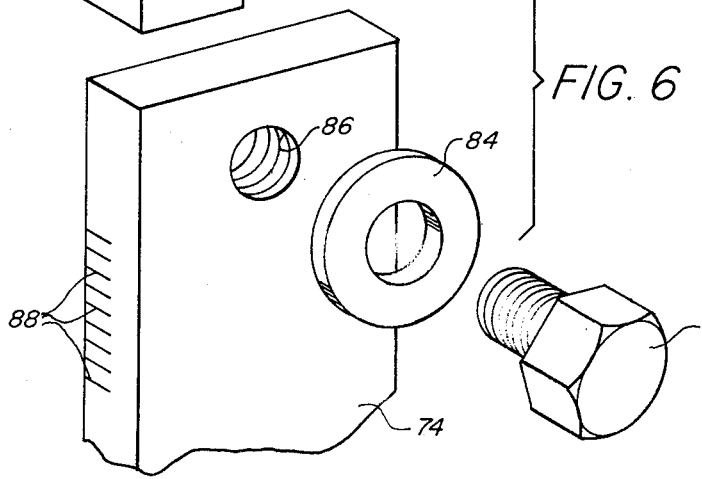

In FIGS. 4–6, to which reference is now made, the tire-mounting rim 72 shown by phantom lines is not of the two-part "curing" type shown in FIGS. 1–3, but rather is of a unitary cylindrical type such as is employed for the mounting of truck tires during vehicular use thereof. The internally threaded cylindrical member 64' shown in FIGS. 4–5 has the same construction and function as the previously-described cylindrical member 64 in FIG. 3, and its internally threaded bores are identified by the same reference numerals with the addition of a prime designation. Releasable mounting means are provided in association with member 64' for the purpose of releasably and concentrically mounting the same within unitary rim 72. Such means includes a plurality of generally-rectangular spoke-like elements 74 carried by and projecting radially outwardly from member 64' centrally of its length, and each having an associated and complementarily-shaped wedge member 76 telescopically and matingly disposed upon its outer end portion for sliding adjustive movement longitudinally thereof. Each member 76 has an open inner end that receives the free end portion of the therewith associated spoke-like member 74; a closed outer end upon which is permanently secured a pad 78 formed of rubber or other high frictional material and having a knurled or otherwise roughened outer surface; and a central slot 80 extending through and longitudinally of one of its side walls. Each member 76 is adapted to be releasably clamped, in any desired one of its possible adjustive positions thereof, upon the outer end portion of the associated one of the spoke-like members 76. The illustrated means employed for the foregoing purpose comprises a plurality of short-length bolt members 82 and associated washers 84. Each bolt 82 extends through the slot 80 of one of the members 76 and into a threaded bore 86 provided within the free end portion of the spoke-like member 74 upon which the member 76 is disposed. The washer 84 carried by each bolt 82 overlies the slotted sidewall of the member 76 through which the bolt extends, and upon tightening of such bolt, clampingly secures the member 76 in whatever longitudinally-adjusted position the same then occupies upon the associated one of the spoke-like members 74. During use of the apparatus of FIGS. 4–6, internally threaded member 64' is placed within rim 72, upon which a tire (not shown) may and normally would already be mounted, and members 76 are slid equal distances radially outwardly along spoke-like members 74 until the outer surfaces of their pads 78 are in firm frictional engagement with the inner cylindrical surface of rim 72. Appropriate indicia 88 (FIG. 4) upon spoke-like members 74 indicates the adjustive positions occupied by members 76, and therefore assists in the aforesaid positioning thereof at precisely the same radial distances from the central axis of cylindrical member 64'. Tightening of bolts 82 then secures members 76 in their aforesaid positions upon spoke-like members 74, as a result of which the latter components wedgingly secure cylindrical member 64' within and in concentric relationship to rim 72. Annular members 44, 44' (FIGS. 1 & 2) are then positioned and secured in place by cylindrical member 64' in the same manner as previously described with respect to the embodiments of FIGS. 1–3.

While preferred embodiments of the invention have been specifically shown and described, this was for purposes of illustration only, and not for purposes of limitation, the scope of the invention being in accordance with the following claims.

That which is claimed is:

1. In a tire retreading apparatus for use in forming an assembly including a tire-mounting rim; a tire mounted upon said rim; a replacement tread strip upon said tire; a flexible envelope having a central portion overlying said tread strip, and first and second marginal edge portions respectively overlying and adapted to be maintained in sealed engagement with respective first and second opposite sidewalls of said tire; and first and second annular envelope-sealing members adapted to be releasably secured in axially aligned relationship with same rim and in closely overlying relationship to respective ones of said first and second marginal edge portions of said envelope; the improvement comprising:

first and second releasable connecting means independently connecting respective ones of said first and second annular members to and in axial alignment with said rim for independent axial movement of each of said members, in response to rotation thereof about its central axis, toward and away from respective first and second ones of said marginal edge portions of said envelope; said first and second connecting means including first and second shaft-like threaded members carried by and projecting axially from respective ones of said first and second annular members, and mating threaded means carried by and extending coaxially of said rim for mating threaded engagement with said first and second threaded members.

2. Apparatus as in claim 1, wherein said tire-mounting rim includes first and second cylindrical rim sections adapted to be inserted into the center opening of said tire from opposite sides thereof; and cooperating means carried by said rim sections for releasably securing said rim sections in axially aligned abutting relationship to each other; and wherein said mating threaded means includes first and second threaded members respectively carried by said first and second rim sections for mating threaded engagement with respective ones of said first and second threaded members carried by said annular members.

3. Apparatus as in claim 2, and further including radially-extending spoke-like means fixedly mounting said first and second threaded members carried by said rim sections within respective first and second ones of said rim sections.

4. Apparatus as in claim 1, wherein said tire-mounting rim includes first and second cylindrical rim sections adapted to be inserted into the center opening of said tire from opposite sides thereof; and cooperating means carried by said rim sections for releasably securing said rim sections in axially aligned abutting relationship to each other; said mating threaded means including an elongate member fixedly secured to one of said rim sections and having opposite first and second threaded end portions matingly engageable with respective ones of said first and second threaded members carried by said annular members.

5. Apparatus as in claim 4, and further including, in association with respective ones of said annular members, a hub-like member disposed concentrically therewithin, and a plurality of spoke-like elements extending between and fixedly innerconnecting said hub-like member and the associated one of said annular members; and wherein said threaded members carried by said annular members project axially from said hub members therewithin.

6. Apparatus as in claim 5, wherein said threaded members carried by said annular members are externally threaded shafts and have terminal end portions disposed during use of said apparatus within said rim.

7. Apparatus as in claim 1, wherein said threaded means includes an elongate threaded member; and further including releasable means for releasably securing said elongate member within and concentrically of said rim.

8. Apparatus as in claim 7, wherein said rim has a generally cylindrical inner surface; and wherein said releasable means includes a plurality of spoke-like members extending radially from said elongate member; a plurality of wedge members each carried by and adjustably movable longitudinally of the free end portion of an associated one of said spoke-like members; and releasable retaining means for releasably retaining said wedge members in desired adjustive positions thereof.

9. Apparatus as in claim 8, wherein each of said wedge members includes a pad of high-frictional material having a roughened outer surface adapted to engage said inner cylindrical surface of said rim.

10. Apparatus as in claim 9, and further including indicia means upon said spoke-like members for indicating the respective adjustive positions occupied by said wedge members relative thereto.

11. Apparatus as in claim 10, wherein each of said spoke-like members has a threaded bore within said outer end portion thereof, and each of said wedge members has an elongate slot extending adjacent said bore; said retaining means including a plurality of bolt elements each threadly received within said bore of an associated one of said spoke-like members and each projecting through said slot of the associated one of said wedge members.

* * * * *